Sept. 23, 1952 P. D. DOUGLASS 2,611,668
MOTOR VEHICLE FRONT WHEEL LUBRICATING DEVICE
Filed Feb. 10, 1950 2 SHEETS—SHEET 1
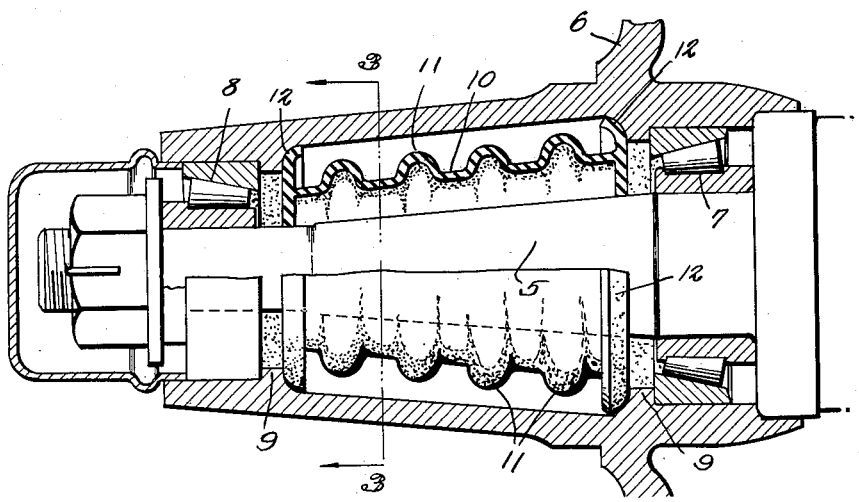
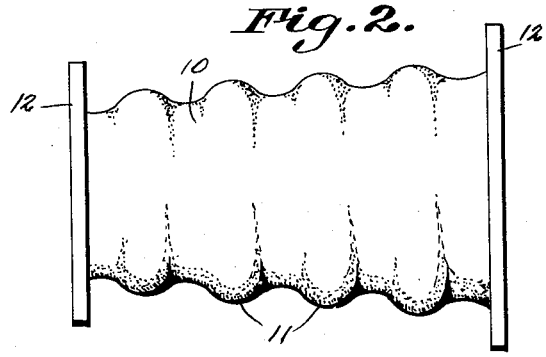
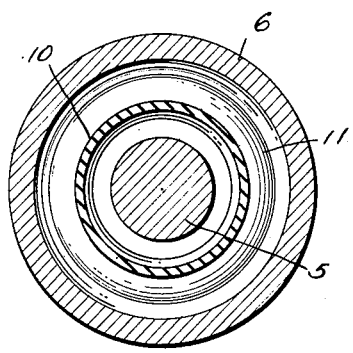
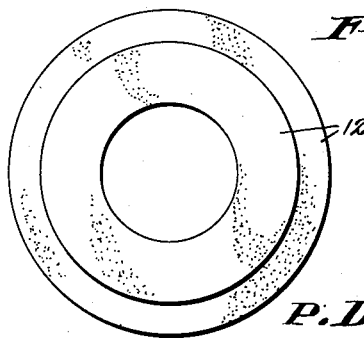
P. D. Douglass
INVENTOR
BY C. A. Snowles
ATTORNEYS.

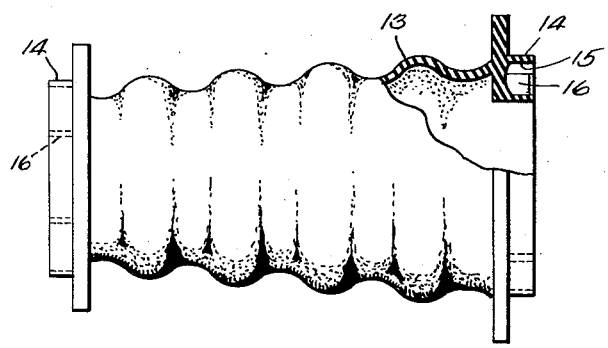
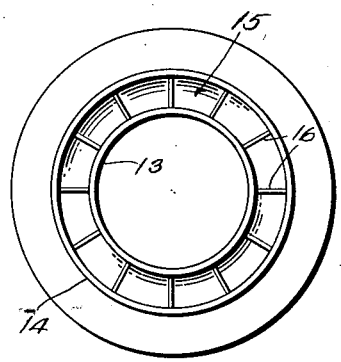
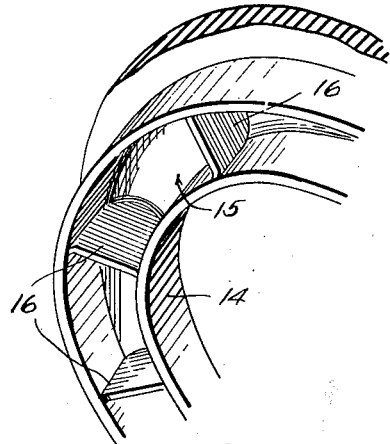
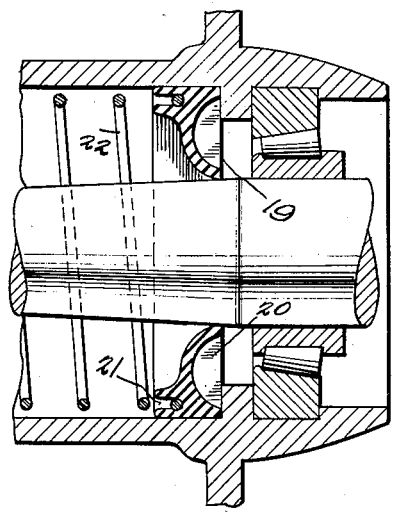
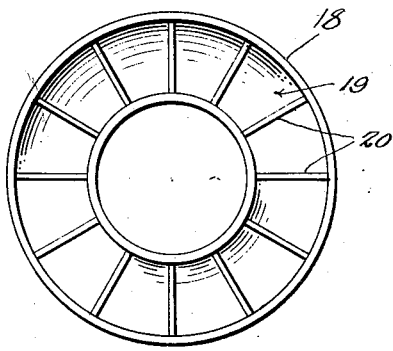

Patented Sept. 23, 1952

2,611,668

UNITED STATES PATENT OFFICE 2,611,668

MOTOR VEHICLE FRONT WHEEL
LUBRICATING DEVICE

Porter D. Douglass, Boulder, Colo.

Application February 10, 1950, Serial No. 143,582

3 Claims. (Cl. 308—187)

This invention relates to motor vehicle front wheel lubrication, and aims to provide a hollow expansible tubular member with discs formed at its ends, the discs pressing against lubricating material packed around the front wheel bearings of a vehicle forcing the lubricating material into the bearings for thorough lubrication thereof.

An important object of the invention is to provide an expansible tubular bellows-like member constructed preferably of neoprene, the bellows-like construction of the member acting to expand longitudinally of the shaft or spindle on which it is mounted, resulting in the grease or lubricant packed around the bearings, being fed into the bearings maintaining the bearings lubricated.

Still another object of the invention is to provide removable neoprene cartridges formed with annular grooves, the grooves being divided by partitions, forming compartments whereby the lubricating material may be evenly distributed to the bearings.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a longitudinal sectional view through a device constructed in accordance with the invention.

Fig. 2 is a side elevational view of the expansible member which is positioned on the spindle or shaft between the bearings thereof.

Fig. 3 is a sectional view taken on line 3—3 of Fig. 1.

Fig. 4 is an end elevational view of the expansible member.

Fig. 5 is a side elevational view of a modified form of expansible member, illustrating grease containing pockets at the ends of the device.

Fig. 6 is an end elevational view of the end of the expansible member.

Fig. 7 is a fragmental perspective view of one end of the device.

Fig. 8 is a vertical sectional view through a removable grease retainer or cartridge showing a further modified form of the grease retainer.

Fig. 9 is an end elevational view of a removable cartridge.

Referring to the drawings in detail, the front axle or spindle of a vehicle is indicated generally by the reference character 5 on which the wheel 6 is mounted, the wheel being provided with inner bearing races 7 and outer bearing races 8, the bearing races being held against the annular ribs 9 formed in the hub of the wheel 6, and which is conventional structure.

The device forming the subject matter of the present invention, comprises a tubular body portion indicated by the reference character 10, the body portion being tapered to conform to the taper of the axle or spindle 5 on which it is mounted, the body portion being of a diameter to provide a space between the body portion and axle or spindle, as clearly shown by Fig. 1 of the drawings.

This tubular body portion is preferably constructed of neoprene and is formed with expansible sections 11 providing a substantially bellows-like construction, the design of the tubular body portion being such that the tendency of the body portion is to expand towards the bearing races.

The ends of the tubular body portion 10 are closed by means of the discs 12 that fit against the inner edges of the annular ribs 9 providing a close fit between the wheel and discs.

These discs are formed with openings to permit the axle or wheel to closely fit the discs and prevent the grease from passing towards the center of the tubular body portion 10.

The space between the outer surfaces of the discs 12 and the adjacent edges of the bearing races, provides compartments for the grease which is packed in these compartments to supply the bearings with grease as the grease becomes heated due to friction.

In the form of the invention as shown by Figs. 5 and 6 of the drawings, the tubular body portion 13 which is also constructed of acid resisting rubber, is bellows-like in formation to cause the body portion to expand longitudinally, exerting pressure on the grease retaining members 14 which are formed integral at the ends thereof. These members 14 are formed with openings so that the tubular body portion will fit over the axle or spindle on which it is positioned, preventing grease from passing between the members 14 and axle or spindle.

The outer surfaces of the grease retaining members 14 are formed with annular grooves 15, which grooves are formed with partitions 16 dividing the annular grooves into pockets for retaining the grease or lubricating material and holding the grease or lubricating material in its proper relation with the bearings and preventing the lubricating material from settling at the bottom of the groove, when the vehicle equipped with the invention is standing for a considerable period of time.

In this form of the invention, the tubular body portion 13 operates in the same manner as the tubular body portion 10 as shown in Fig. 1 of the drawings, the tubular body portion expanding to urge the lubricating material into the bearings.

As shown by Fig. 9 of the drawings, a cartridge indicated by the reference character 18, is formed with an annular groove 19 in one surface thereof, the annular groove being divided by partitions 20 which divide the groove into individual compartments that are packed with grease, the compartments being directed towards the bearings with which the cartridge is used.

The inner surface of the cartridge is formed with an annular groove 21 which is of a size to accommodate the end coil of a spring as indicated by the reference character 22. It is obvious that the opposite end of the spring will engage the grease cartridge at the opposite end of the spindle and act to spread the cartridges and move them towards the bearings lubricated thereby.

From the foregoing it will be seen that due to the construction shown and described, I have provided a grease retainer and means for forcing the grease retainer towards the bearing lubricated thereby, the grease retainer being such that it may be readily and easily mounted on an automobile front wheel axle or spindle supplying lubricating material to the bearings at all times.

Having thus described the invention, what is claimed is:

1. The combination with the spaced bearing races of a spindle and wheel hub operating on the spindle, of a lubrication control mechanism comprising an expansible tubular member fitted on the spindle encasing the spindle between the bearing races and being expansible longitudinally of the spindle towards the bearing races, and discs formed at the ends of the tubular member engaging said wheel hub and spindle housing forcing lubricating material packed around the bearings, into said bearings.

2. The combination with the spaced bearing races of a spindle and wheel operating on the spindle, of a lubrication control mechanism comprising circular members having compartments in one surface thereof, the compartments containing lubricating material, and an expansible member supported between adjacent circular members urging the circular members towards the bearing races forcing lubricating material into the bearing races.

3. The combination with the spaced bearing races of a spindle and wheel operating on the spindle, of a lubrication control mechanism comprising a tubular member constructed of rubber resistant to acids, fitted around said spindle in spaced relation therewith, said tubular member being bellows-like in construction and being expansible longitudinally of the spindle on which it is mounted, grease discs at the ends of the tubular member disposed adjacent to the bearing races, and said discs having grease retaining grooves facing the bearing races adapted to supply grease to said bearings as the tubular member expands.

PORTER D. DOUGLASS.

REFERENCES CITED

The following references are of record in the file of this patent:

UNITED STATES PATENTS

| Number | Name | Date |
|---|---|---|
| 168,845 | Pratt | Oct. 19, 1875 |
| 2,443,201 | Sluyter | June 15, 1948 |
| 2,457,537 | Douglass | Dec. 28, 1948 |